(12) United States Patent
Payraud (10) Patent No.: US 11,326,911 B2
(45) Date of Patent: May 10, 2022

(54) FASTENING DEVICE FOR HOLDING A SENSOR, COMPRISING A CAM

(71) Applicant: Pierre Payraud, Thyez (FR)

(72) Inventor: Pierre Payraud, Thyez (FR)

( * ) Notice: Subject to any disclaimer, the term of this patent is extended or adjusted under 35 U.S.C. 154(b) by 0 days.

(21) Appl. No.: 17/275,241

(22) PCT Filed: Sep. 30, 2019

(86) PCT No.: PCT/IB2019/058281
§ 371 (c)(1),
(2) Date: Mar. 11, 2021

(87) PCT Pub. No.: WO2020/070615
PCT Pub. Date: Apr. 9, 2020

(65) Prior Publication Data
US 2022/0042832 A1 Feb. 10, 2022

(30) Foreign Application Priority Data
Oct. 5, 2018 (FR) ...................................... 18 59227

(51) Int. Cl.
*G01D 11/30* (2006.01)

(52) U.S. Cl.
CPC .................................. *G01D 11/30* (2013.01)

(58) Field of Classification Search
CPC ..... G01D 11/30; G01D 11/305; G01D 11/245
See application file for complete search history.

(56) References Cited

U.S. PATENT DOCUMENTS

2005/0284230 A1  12/2005  Auclair

FOREIGN PATENT DOCUMENTS

| DE | 10 2008 050 902 A1 | 3/2010 |
| FR | 2686690 A1 | 7/1993 |
| WO | 2018047105 A1 | 3/2018 |

*Primary Examiner* — Jamel E Williams
(74) *Attorney, Agent, or Firm* — William H. Eilberg (57) ABSTRACT

A fastening device for holding a sensor includes a clamping piece which is acted on by a cam, in order to be movable between a release position and a clamping position.

16 Claims, 7 Drawing Sheets

FASTENING DEVICE FOR HOLDING A SENSOR, COMPRISING A CAM

TECHNICAL FIELD OF THE INVENTION

The present invention relates to the field of sensors and is more particularly concerned with a fastening device for holding a sensor.

Proximity sensors having a cylindrical shape bounded by a proximal end and a distal end are known. These sensors may be capacitive, inductive, optoelectronic or of the fiber optic type for example, and usually have a circular cross section. Such sensors are used for example in machine tools or on automated manufacturing lines to detect the presence of an object and/or to measure the distance at which the object is situated. These sensors are removable and interchangeable, and their position needs to be able to be adjusted and fixed.

In order to hold one of these sensors in a position that is fixed and adjustable in relation to their environment, fastening devices, comprising:
- a body comprising a longitudinal through-passage extending along a first longitudinal axis between a first end and a second end, said longitudinal through-passage being intended to accept said sensor,
- axial-immobilization means for immobilizing the sensor in the longitudinal through-passage, are known.

The axial-immobilization means generally require, in order to actuate them, a very clear empty space around the fastening device (for example for the use of an open-ended wrench). This is a disadvantage when the fastening device is installed somewhere that is not readily accessible, or else in a confined space, as is often the case in machine tools or on an automated manufacturing line.

DISCLOSURE OF THE INVENTION

One problem addressed by the present invention is that of providing a fastening device wherein the axial-immobilization means can be actuated quickly and easily, even in an environment in which there is little space available radially around the fastening device.

At the same time, the present invention seeks to provide a fastening device comprising axial-immobilization means that allow a sensor to be immobilized in a way that is simple, quick and reliable.

In order to achieve these objectives as well as others, the invention proposes a fastening device for holding a sensor having a cylindrical shape bounded by a proximal end and a distal end, the fastening device comprising:
- a body comprising a longitudinal through-passage extending along a first longitudinal axis between a first end and a second end, said longitudinal through-passage being intended to accept said sensor,
- axial-immobilization means for immobilizing the sensor in the longitudinal through-passage, according to the invention the axial-immobilization means comprise:
- a flange, solid with the body, flaring out radially from and away from the body and the first longitudinal axis,
- a cam mounted with the ability to rotate on the flange about a second longitudinal axis parallel to the first longitudinal axis and offset radially away from the first longitudinal axis,
- drive means rotationally driving the cam about the second longitudinal axis which are preferably accessible on a frontal end face of the cam, said frontal end face being substantially perpendicular to the first longitudinal axis,
- a clamping piece that is fixed along the first longitudinal axis with respect to the body and comprising a clamping surface intended to come into contact with the exterior surface of the sensor, and urged by the cam so as to be radially movable between at least:
  - a clamping position in which the clamping surface is distant from the first longitudinal axis by a first distance,
  - a release position in which the clamping surface is distant from the first longitudinal axis by a second distance, the second distance being greater than the first distance.

The use of a cam is simple and intuitive to any operator. The cam can be driven in rotation about the second longitudinal axis by means (such as a screwdriver) preferably acting on a frontal end face of the cam (said frontal end face being substantially perpendicular to the first longitudinal axis), said means thus occupying very little space radially. The clamping position is reached in less than half a turn of the cam about the second longitudinal axis, allowing for rapid immobilization.

As a preference, the body may comprise an interior screw thread over at least part of its length and/or the clamping surface comprises a screw thread intended to engage with an exterior screw thread provided on the exterior surface of the sensor.

The sensor can thus be screwed into the longitudinal passage of the body and then, once the desired longitudinal position has been reached, it can be held in place by the immobilizing means preventing any additional or reverse rotation that might affect its longitudinal positioning. The screw-tight collaboration between the sensor and the body allows progressive and precise positioning along the first longitudinal axis.

Advantageously, the drive means for driving the rotation of the cam may comprise, on the cam, a male or female socket drive of non-circular cross section, said socket drive extending parallel to the first longitudinal axis. As a preference, said socket drive is accessible on a frontal end face of the cam, said frontal end face being substantially perpendicular to the first longitudinal axis.

As a preference, at the second end of the body, a flaring may extend radially inward and define an orifice having a cross section with dimensions smaller than the dimensions of the cross section of the sensor.

The radial flaring may take the form of an annular ring or the form of one or more tabs extending radially toward the first longitudinal axis. The radial flaring constitutes an end stop that limits the penetration of the sensor into the body along the first longitudinal axis in order to keep the distal end of this sensor properly protected inside the body. The risk of damage to the distal end of the sensor is thus reduced.

Advantageously, the cam may be a pin-mounted eccentric comprising:
- a first cylindrical portion of circular cross section extending along a third longitudinal axis, and intended to be housed for rotation in a hole formed in the flange along the second longitudinal axis,
- a second cylindrical portion of circular cross section extending along a fourth longitudinal axis that is radially offset away from the third longitudinal axis, said second cylindrical portion being equipped with a lateral surface that is intended to come to bear against the clamping piece in order to urge the clamping piece to move from a release position to a clamping position.

The pin-mounted eccentric thus has a shape that is simple to manufacture.

Advantageously, the cylindrical lateral surface of the second cylindrical portion may be equipped with reliefs, the reliefs preferably consisting of knurling.

The reliefs, such as those of a knurling, provide better rotational immobilization of the eccentric-mounted pin through rougher contact with the clamping piece. This proves to be of particular benefit when the fastening device is used in an environment subject to vibrations.

According to a first embodiment of the invention, the clamping piece may be formed of one piece with the flange. This then limits the risk of the clamping piece becoming lost.

In such an embodiment, provision may be made that:
the clamping piece comprises an arm comprising the clamping surface,
said arm is connected to the flange by a spacer piece which holds the arm away from the flange along the first longitudinal axis,
said arm is able to pivot in a transverse plane by elastic deformation of at least part of the arm and/or of the spacer piece.

At rest, the clamping piece is in a stable release position in which it is immobile with respect to the flange. The operator can thus be certain, as soon as the pin-mounted eccentric is not acting upon the arm (any longer), that he or she can engage the sensor into the longitudinal passage unimpeded and using just one hand (the operator need not use the other hand to hold the clamping piece in the release position, this being an important factor in places that are difficult to access).

Advantageously, the arm may hold captive along the second longitudinal axis II-II the cam mounted with the ability to rotate in a hole in the flange.

According to a second embodiment of the invention, the clamping piece may consist of a component separate from the flange.

In such an embodiment, provision may be made that, in the release position, the cam immobilizes the clamping piece with respect to the flange. Once again, this gives the clamping piece a stable release position: the operator is thus certain, as soon as the cam immobilizes the clamping piece with respect to the flange, that the sensor can be engaged into the longitudinal passage unimpeded and using just one hand (the operator need not use the other hand to hold the clamping piece in the release position, this being an important factor in places that are not easily accessible).

As a preference, provision may be made that:
the clamping piece may comprise a through-passage consisting of a first through-passage portion extended by a second through-passage portion, the first through-passage portion having a cross section of dimensions smaller than those of the second through-passage portion,
the first through-passage portion may have a circular cross section of diameter greater than the diameter of the cross section of the first cylindrical portion of the pin-mounted eccentric,
the second through-passage portion may have a circular cross section that complements the shape of the cross section of the second cylindrical portion of the pin-mounted eccentric.

The clamping piece thus has a shape that is simple and inexpensive to manufacture.

Advantageously, the radial offset between the fourth longitudinal axis and the third longitudinal axis may be greater than the difference between the diameter of the first through-passage portion of the clamping piece and the diameter of the first cylindrical portion of the pin-mounted eccentric.

Such sizing allows the clamping piece to be immobilized with respect to the flange in the release position easily and simply by means of the pin-mounted eccentric.

As a preference, the body may comprise a tubular portion having an exterior screw thread over at least part of its length. The body may thus be mounted in a support easily by screwing, or mounted easily through a support and then fastened in place by means of a nut and a counter-nut.

In a variant, provision may be made that:
the flange is solid with the body while being mounted with the ability to rotate with respect to the body about the first longitudinal axis,
the body comprises a drive portion of non-circular cross section.

The body can thus be driven in rotation in order to fasten it into a support or remove it from a support, while keeping the orientation of the flange fixed with respect to said support. That means that the fastening device can be positioned or repositioned on, or removed from, a support without the need to have removed beforehand the sensor that it contains, while at the same time limiting the risk of torsion on the wire to which the sensor is connected, in order not to damage same.

In another variant, the body and the flange may be formed in a single piece as an assembly of substantially parallelepipedal shape.

BRIEF DESCRIPTION OF THE DRAWINGS

Further objects, features and advantages of the present invention will become apparent from the following description of particular embodiments, which is given in relation to the attached figures, among which.

DESCRIPTION OF THE PREFERRED EMBODIMENTS

Figure 2:
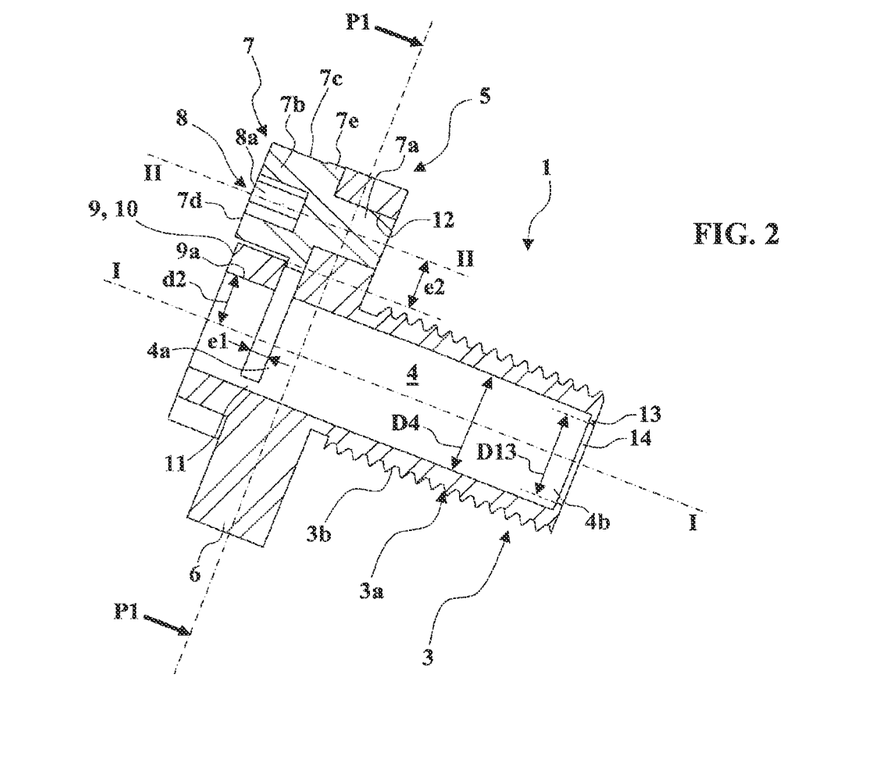
FIG. 2 is a view in longitudinal section of the fastening device of FIG. 1, the clamping piece being positioned in a release position.
Figure 3:
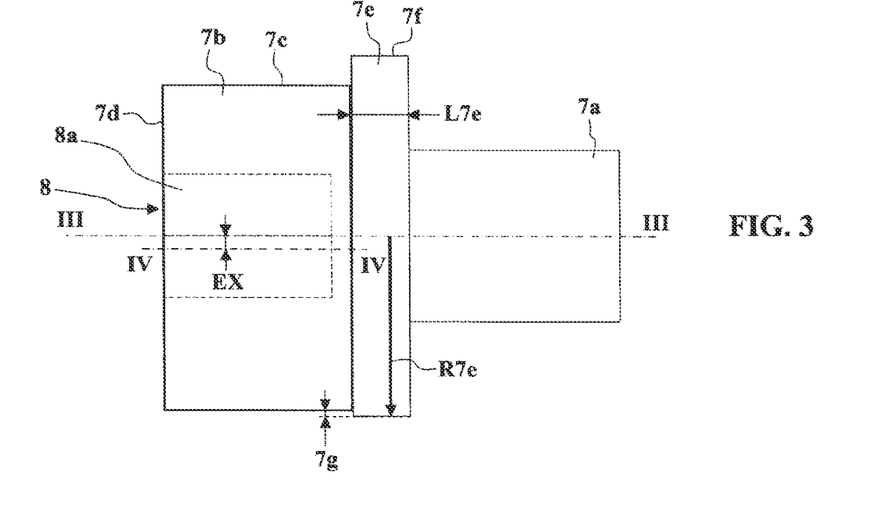
FIG. 3 is a side view of a cam used in the fastening device of FIG. 1.
Figure 4:
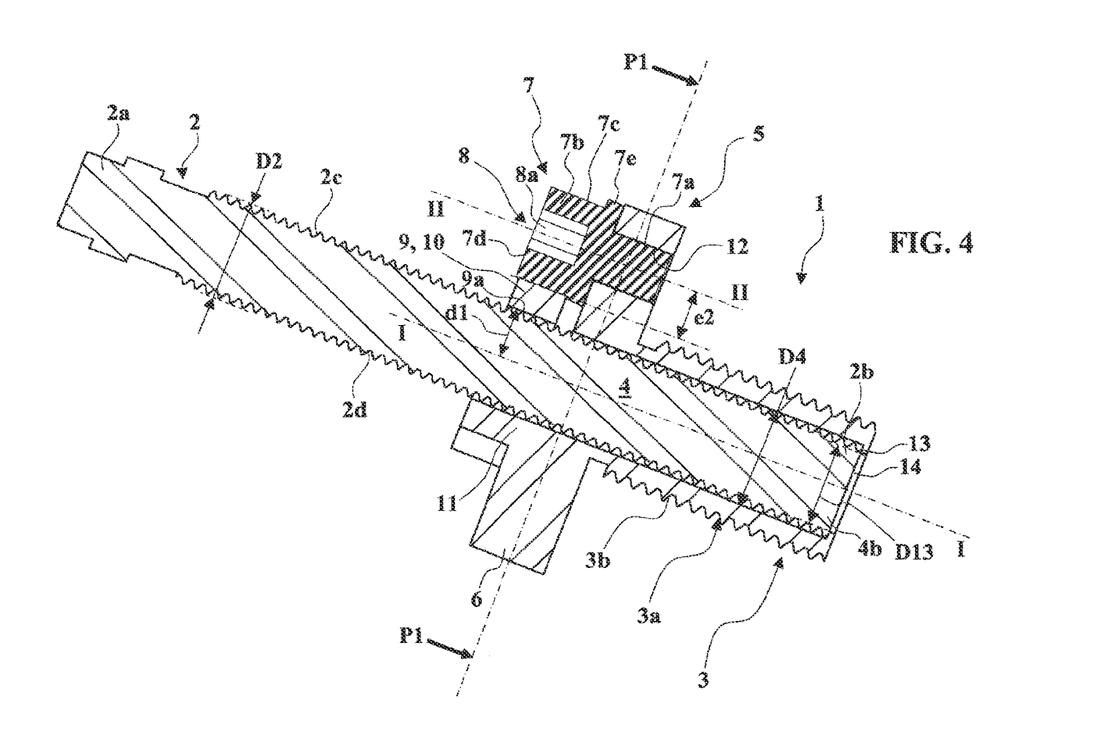
FIG. 4 is a view in longitudinal section of the fastening device of FIG. 1, with a sensor positioned in the body, the clamping piece being positioned in the clamping position.

FIGS. 1 to 8 and 13 on the one hand, and FIGS. 9 to 12 on the other, respectively illustrate a first embodiment and a second embodiment of a fastening device 1 according to the present invention, which is intended to hold a sensor 2 of cylindrical shape bounded by a proximal end 2a and a distal end 2b (FIG. 4).

In all the embodiments, the fastening device 1 comprises:
- a body 3 comprising a longitudinal through-passage 4 extending along a first longitudinal axis I-I between a first end 4a and a second end 4b, said longitudinal through-passage 4 being intended to accept said sensor 2,
- axial-immobilization means 5 for immobilizing the sensor 2 in the longitudinal through-passage 4.

In more detail, the axial-immobilization means 5 comprise:
- a flange 6, solid with the body 3, flaring out radially from and away from the body 3 and the first longitudinal axis I-I,
- a cam 7 mounted with the ability to rotate on the flange 6 about a second longitudinal axis II-II parallel to the first longitudinal axis I-I and offset radially away from the first longitudinal axis I-I,
- drive means 8 rotationally driving the cam 7 about the second longitudinal axis II-II,
- a clamping piece 9 that is fixed along the first longitudinal axis I-I with respect to the body 3 and comprising a clamping surface 9a intended to come into contact with the exterior surface 2c (substantially cylindrical lateral surface, possibly threaded) of the sensor 2, the clamping piece 9 being urged by the cam 7 so as to be radially (in a transverse plane P1) movable between at least:
  - a clamping position (FIG. 4) in which the clamping surface 9a is distant from the first longitudinal axis I-I by a first distance d1,
  - a release position (FIG. 2) in which the clamping surface 9a is distant from the first longitudinal axis I-I by a second distance d2, the second distance d2 being greater than the first distance d1.

In the first embodiment, the clamping piece 9 is formed as one piece with the flange 6.

Figure 1:
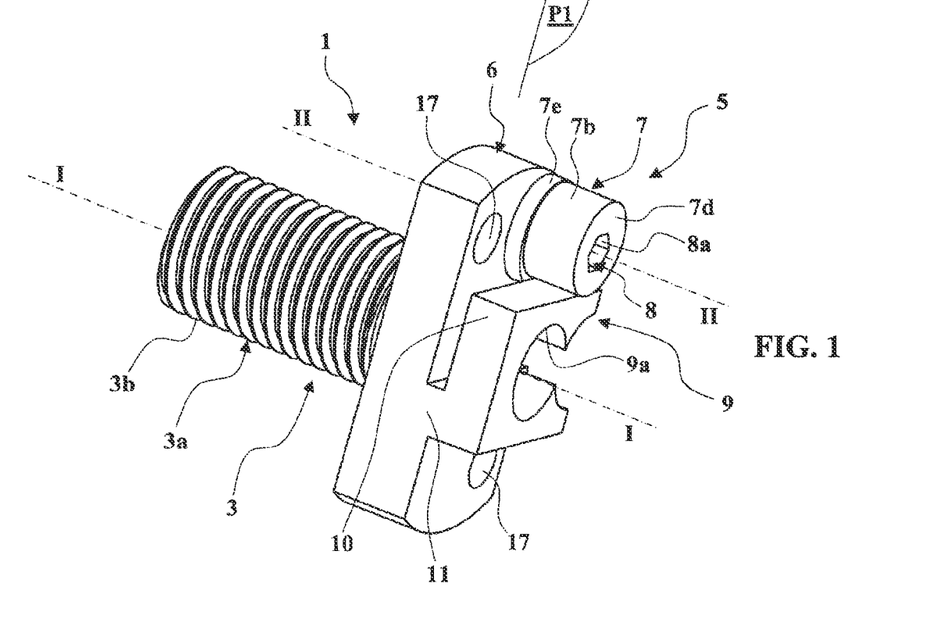
FIG. 1 is a perspective view of a first embodiment of a fastening device according to the invention.

More specifically, as can be seen in FIGS. 1 and 2, the clamping piece 9 comprises an arm 10 comprising the clamping surface 9a. The arm 10 is connected to the flange 6 by a spacer piece 11 which keeps the arm 10 away from the flange 6 along the first longitudinal axis I-I (separation e1).

The arm 10 is able to pivot in the transverse plane P1 by elastic deformation of at least part of the material of which the arm 10 is made and/or of at least part of the material of which the spacer piece 11 is made.

When the arm 10 is not urged by the cam 7, it is returned elastically to the release position. The clamping piece 9 (arm 10) thus has a release position that is stable and in which the clamping piece 9 is situated out of the continuation of the cross section of the longitudinal through-passage 4 so as not to impede the introduction of the sensor 2 into the longitudinal through-passage 4 or the removal of the sensor 2 from the longitudinal through-passage 4.

The cam 7 is more particularly visible in FIG. 3. This cam is a pin-mounted eccentric, comprising:
- a first cylindrical portion 7a of circular cross section extending along a third longitudinal axis III-III, and intended to be housed for rotation in a hole 12 (FIGS. 2 and 4) formed in the flange 6 along the second longitudinal axis II-II,
- a second cylindrical portion 7b of circular cross section extending along a fourth longitudinal axis IV-IV that is radially offset away from the third longitudinal axis III-III, said second cylindrical portion 7b being equipped with a lateral surface 7c that is intended to come to bear against the clamping piece 9 in order to urge the clamping piece 9 to move from a release position (FIG. 2) to a clamping position (FIG. 4).

The second cylindrical portion 7b may have a non-circular cross section, for example an oval or polygonal cross section, extending along a fourth longitudinal axis IV-IV which may be centered or off-centered with respect to the third longitudinal axis III-III.

In the embodiment illustrated in FIG. 3, the cylindrical lateral surface 7c of the second cylindrical portion 7b is smooth. As an alternative, this cylindrical lateral surface 7c may be provided with reliefs, for example reliefs consisting of knurling.

The offset between the third longitudinal axis and the fourth longitudinal axis IV-IV corresponds to the eccentricity EX of the second cylindrical portion 7b with respect to the first cylindrical portion 7a.

It can be seen in FIG. 1 that the drive means 8 for driving the rotation of the pin-mounted eccentric 7 (cam) comprise a female socket drive 8a of noncircular cross section, said socket drive 8a extending parallel to the first longitudinal axis I-I. The socket drive 8a in this instance is hexagonal, and furthermore extends coaxially with respect to the third longitudinal axis III-III.

As an alternative to a female socket drive 8a, recourse may be had to a "male" socket drive, namely a socket-shape that projects from and away from a end face 7d of the second cylindrical portion 7b along the third longitudinal axis III-III.

In both of the alternatives, female socket drive 8a or male socket drive, the socket drives are accessible in the frontal end face of the cam 7, said frontal end face 7d being substantially perpendicular to the first longitudinal axis I-I, to drive the rotation of the cam 7.

In FIG. 3, the cam (pin-mounted eccentric) 7 further comprises an intermediate cylindrical portion 7e of circular cross section extending along the third longitudinal axis III-III (and therefore coaxial with the first cylindrical portion 7a). The intermediate cylindrical portion 7e has an outside radius R7e slightly greater than the radial separation e2 between the second longitudinal axis II-II and the arm 10 (when the arm 10 is in the release position, FIG. 2). The intermediate cylindrical portion 7e has an axial length L7e less than or equal to the separation e1 between the arm 10 and the flange 6 (FIGS. 2 and 4). Finally, in spite of its eccentricity, the second cylindrical portion 7b is always situated so that it is set back from the peripheral lateral edge 7f of the intermediate cylindrical portion 7e by a minimum radial setback 7g. The intermediate cylindrical portion 7e and the arm 10 thus collaborate to hold the pin-mounted eccentric 7 (cam) captive on the flange 6 through the engagement of the first cylindrical portion 7a in the hole 12.

Figure 7:
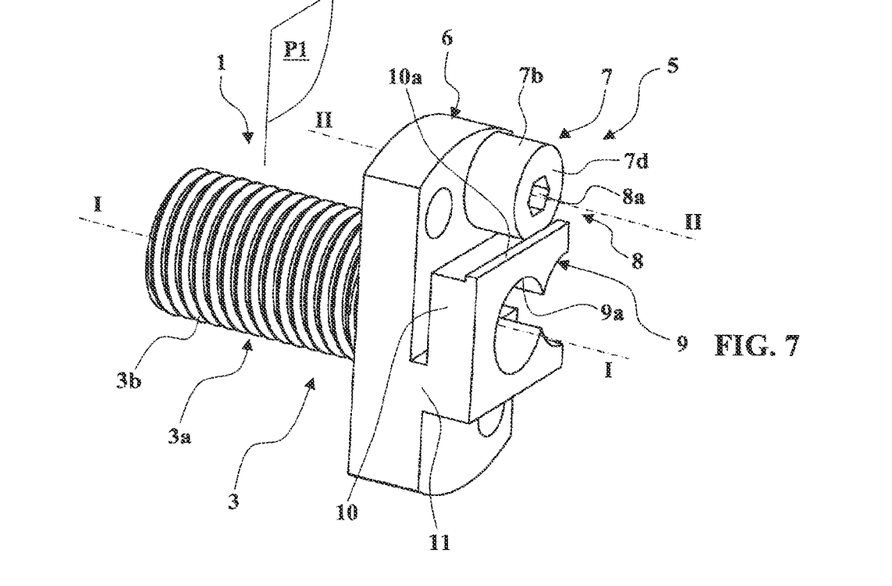
FIG. 7 is a perspective view of a variant of the first embodiment illustrated in FIG. 1.

As an alternative, recourse may be had to the variant illustrated in FIG. 7, in which the pin-mounted eccentric 7 (cam) has no intermediate portion 7e. The arm 10 for its part is provided with a rib 10a extending parallel to the transverse plane P1 and in the direction of the second longitudinal axis II-II. The rib 10a always (in all the release positions and all the clamping positions) partially overlaps the frontal end face 7d of the second cylindrical portion 7b. The rib 10a thus acts as an end stop opposing relative axial movement (along the second longitudinal axis II-II) of the pin-mounted eccentric 7 (cam) away from the flange 6. The frontal end face 7d and the rib 10a of the arm 10 thus collaborate to keep the pin-mounted to eccentric 7 (cam) captive on the flange 6 by engagement of the first cylindrical portion 7a in the hole 12.

Thus, whether in the context of the variant illustrated in FIGS. 1 to 6 or in the context of the variant illustrated in FIG. 7, the arm 10 holds captive, along the second longitudinal axis II-II, the pin-mounted eccentric 7 (cam) mounted with the ability to rotate in the hole 12 of the flange 6. The number of component parts is thus reduced, and assembly is simplified.

It may be seen more particularly in FIGS. 2 and 4 that the longitudinal through-passage 4 is plain and allows the sensor 2 to be received with the ability to slide (the longitudinal through-passage 4 having an inside diameter D4 slightly greater than the outside diameter D2 of the sensor 2). The exterior surface 2c of the sensor 2 may in this case be plain, unlike that which is illustrated in the figures.

As an alternative, the body 3 may have an interior screw thread over at least part of its length (over part of the length of the longitudinal through-passage 4) and/or the clamping surface 9a comprises a screw thread, said screw thread (internal thread in the case of the body 3) being intended to collaborate with an exterior screw thread 2d provided on the exterior surface 2c of the sensor 2.

In these same FIGS. 2 and 4, it may be seen that, at the second end 4b of the longitudinal through-passage 4, a flaring 13 extends radially inward and defines an orifice 14 of a cross section that has at least one dimension smaller than the dimensions of the cross section of the sensor. In this instance, the flaring 13 is annular: it thus takes the form of a ring having an outside diameter equal to the inside diameter to D4 of the longitudinal through-passage 4 and an inside diameter D13 smaller than the outside diameter D2 of the sensor 2. The flaring 13 thus forms an end stop allowing the distal end 2b of the sensor 2 to be kept inside the longitudinal through-passage 4 of the body 3 so as to protect it and/or so as to position it at a precise predetermined axial position.

If confining the distal end 2b of the sensor 2 inside the longitudinal through-passage 4 of the body 3 is not desirable or not necessary, the second end 4b of the longitudinal through-passage 4 may alternatively have no flaring 13.

In FIGS. 1 to 12, the body 3 has a tubular portion 3a having an external screw thread 3b over at least part of its length (in this particular instance over the entirety of its length here). The exterior screw thread 3b allows the fastening device 1 to be mounted for example in a support such as a bracket 15 illustrated in FIG. 6, using a nut 16 and a counter-nut 16a. The bracket 15 for its part is secured (inseparably or removably) to the machine tool or to the automated manufacturing line.

Figure 8:
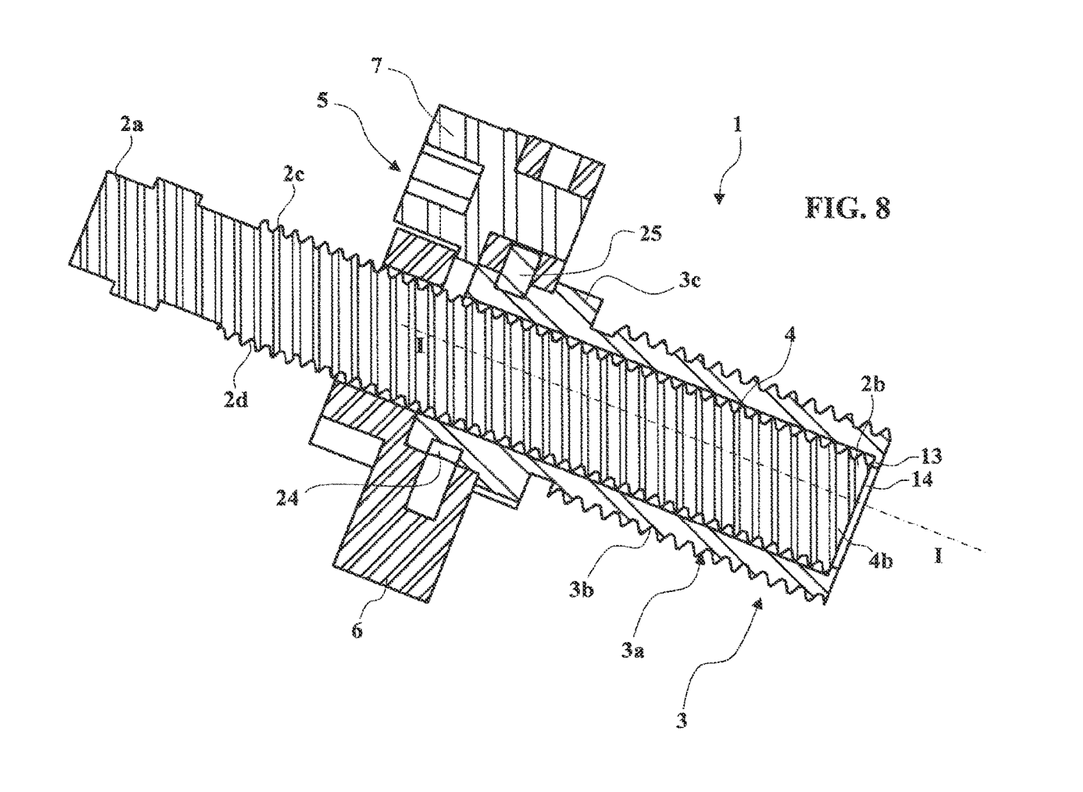
FIG. 8 is a view in longitudinal section of another variant of the first embodiment illustrated in FIG. 1.
Figure 9:
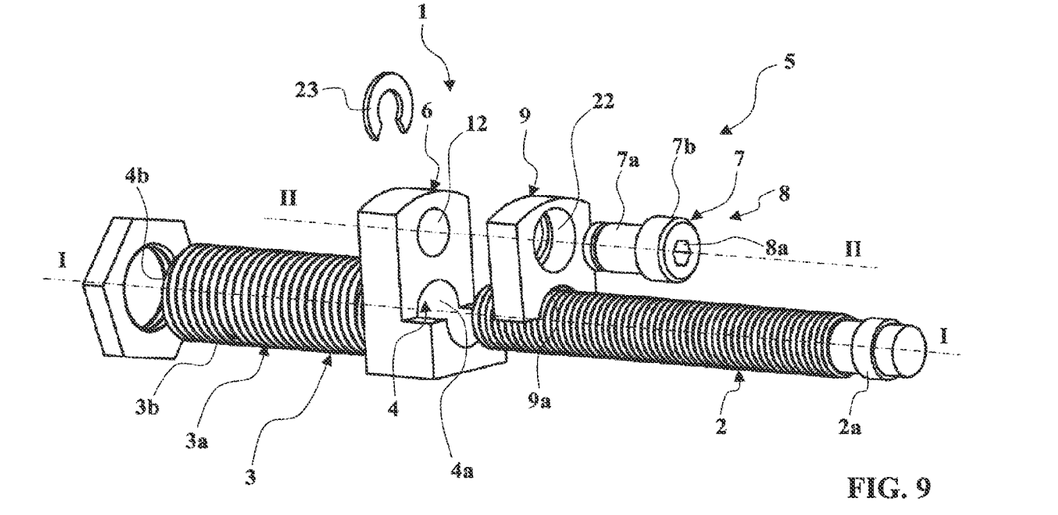
FIG. 9 is a perspective exploded view of a second embodiment of a fastening device according to the invention, with a sensor.
Figure 10:
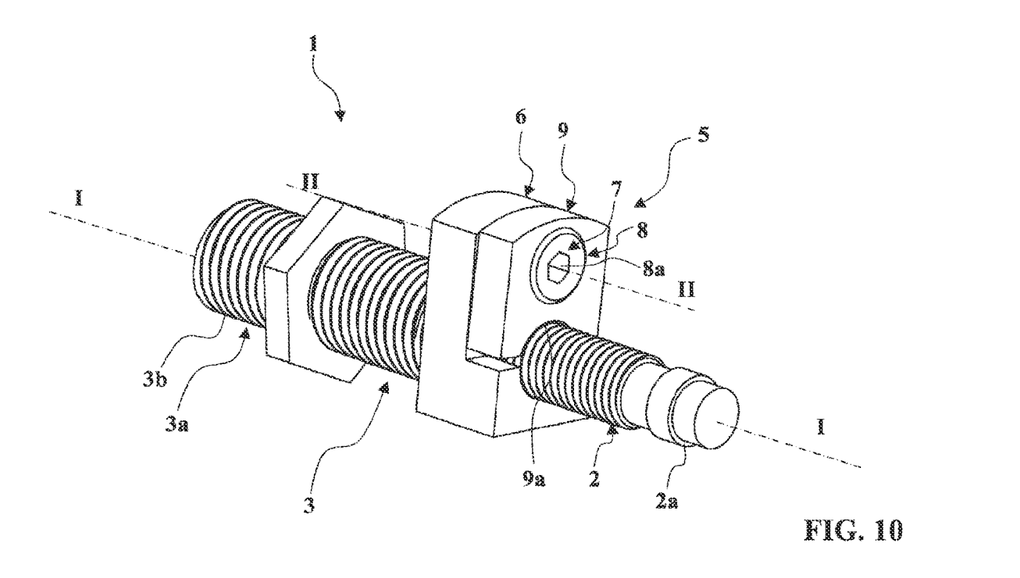
FIG. 10 is a perspective view of the fastening device of FIG. 9 in the assembled state, with a sensor.

In the variant illustrated in FIG. 8, the flange 6 is secured to the body 3 being mounted with the ability to rotate with respect to the body 3 about the first longitudinal axis I-I. To do that, the body 3 comprises a circular groove 24 in which an axial retaining pin 25 is engaged, which pin is simultaneously engaged with the flange 6. The body 3 comprises a drive portion 3c of noncircular (for example hexagonal) cross section. The body 3 may thus be rotationally driven with respect to the flange 6 so that it can be screwed (into a support or a frame of a machine for example), while maintaining a fixed orientation of the flange 6.

Figure 5:
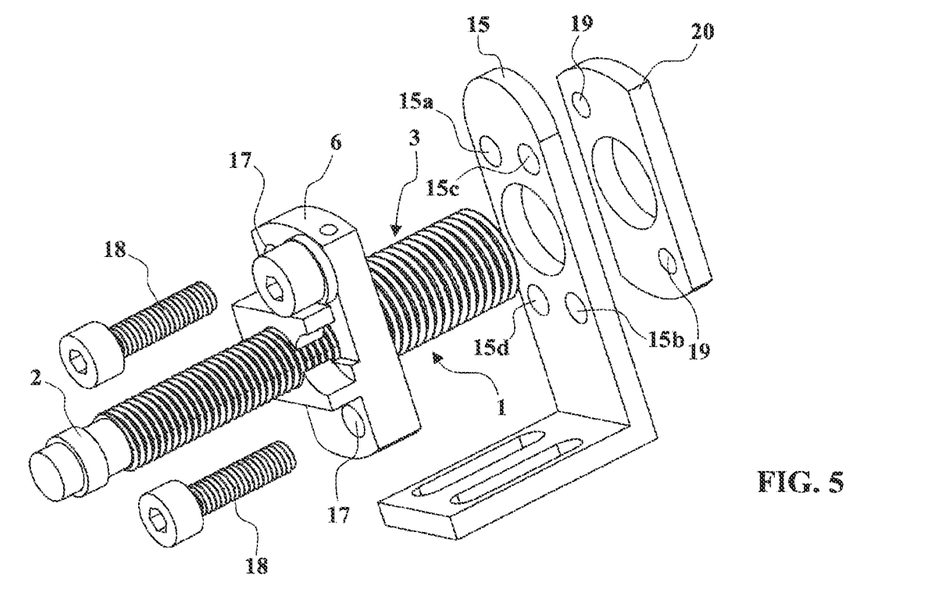
FIG. 5 is a perspective view illustrating one particular way of attaching the fastening device of FIG. 1 to a support.
Figure 6:
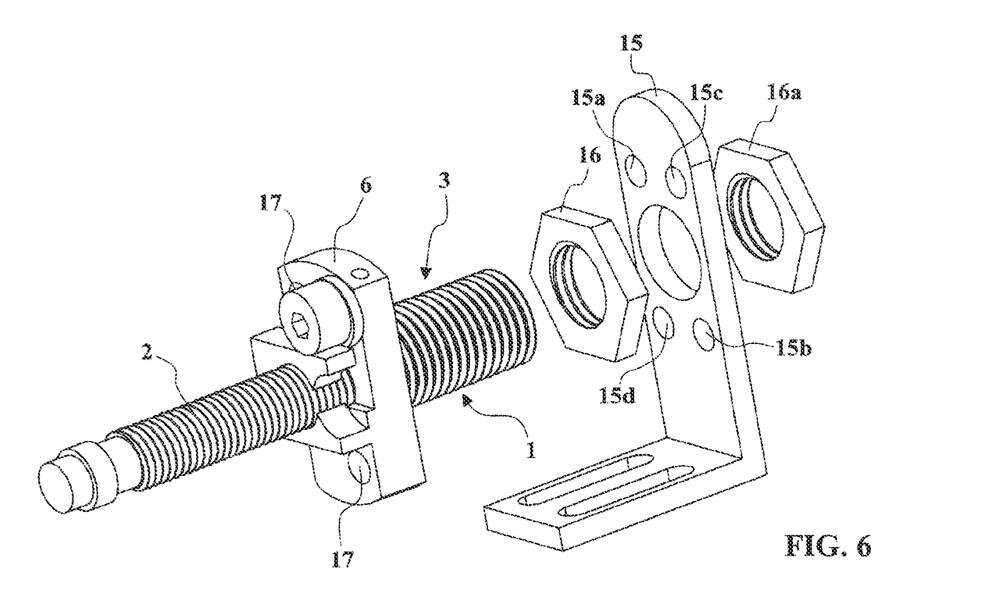
FIG. 6 is a perspective view illustrating another particular way of attaching the fastening device of FIG. 1 to a support.

An alternative setup to the one of FIG. 6 is illustrated in FIG. 5. The flange 6 is provided with two through-holes 17 for the passage of screws 18 which are intended to be screwed into two threaded holes 19 of a secondary flange 20. The bracket 15 is therefore sandwiched between the flange 6 and the secondary flange 20. However, it is possible to dispense with the secondary flange 20 if the holes 15a and 15b or 15c and 15d are threaded so that the screws 18 can be screwed into them.

Figure 13:
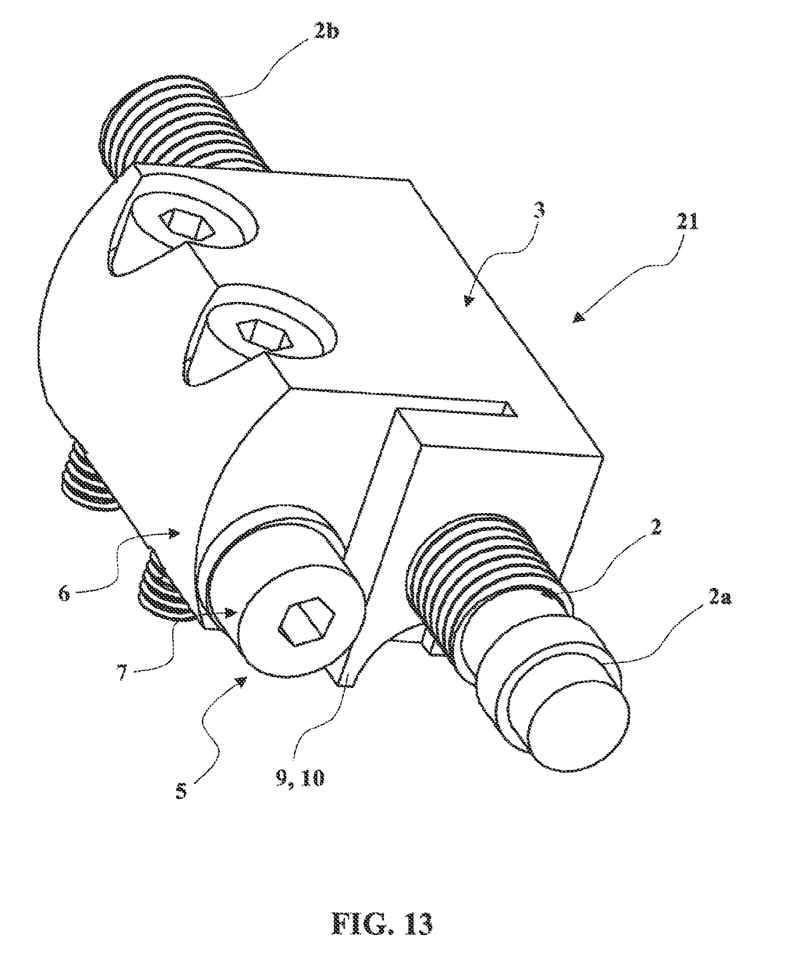
FIG. 13 is a perspective view of another variant of the first embodiment illustrated in FIG. 1.

FIG. 13 illustrates another variant of the fastening device 1, in which the body 3 and the flange 6 are formed as a single piece in the form of a substantially parallelepipedal assembly 21.

In the second embodiment illustrated in FIGS. 9 to 12, the clamping piece 9 consists of a component distinct from the flange 6. The numerical references used in the context of the description of the first embodiment refer to elements in the second embodiment which are identical or equivalent.

Figure 11:
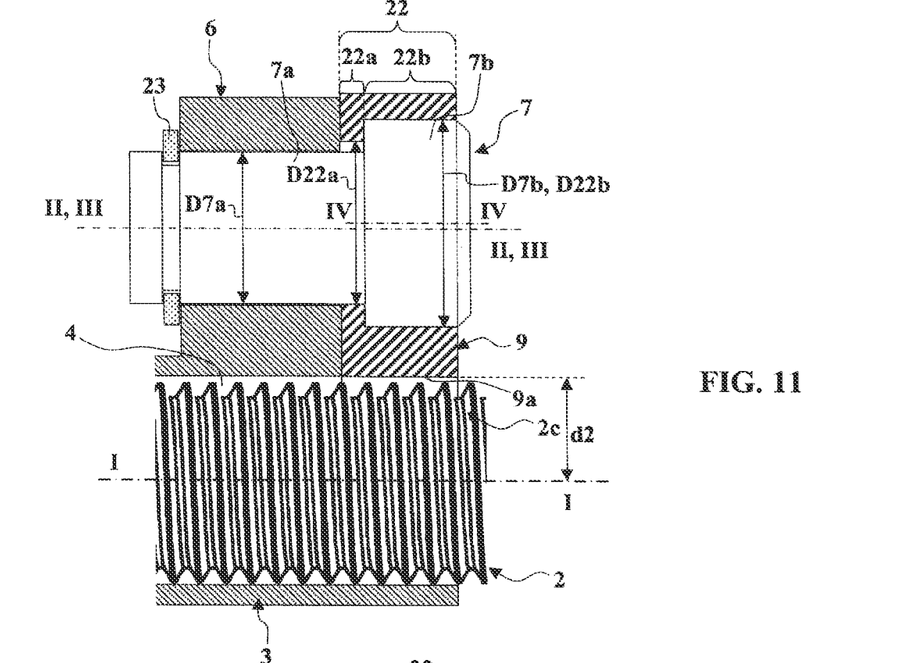
FIG. 11 is a detailed view in cross section of the fastening device of FIG. 10, with the clamping piece in the release position.
Figure 12:
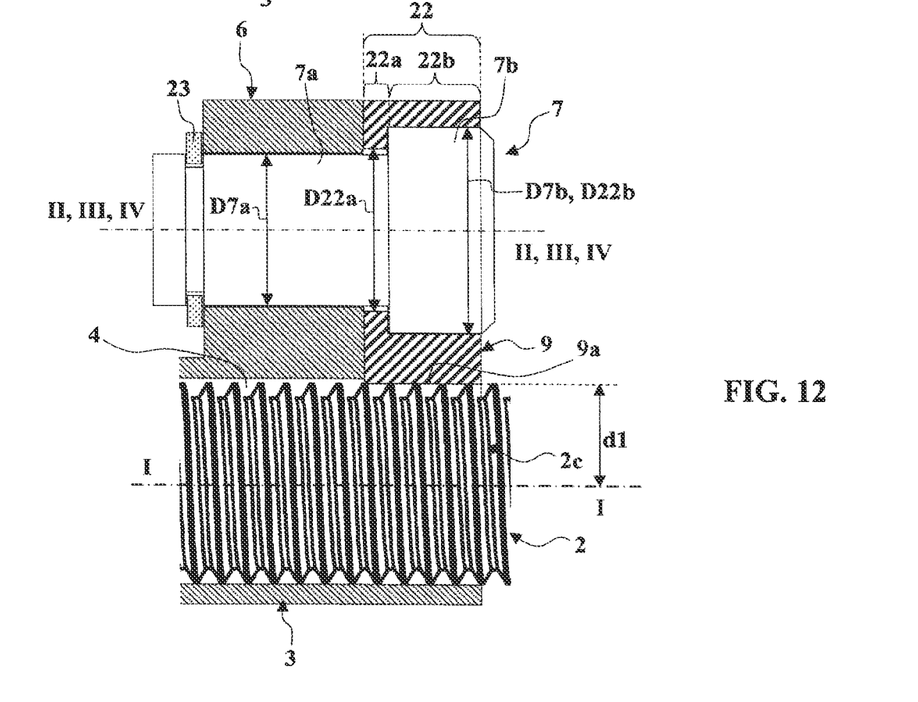
FIG. 12 is a detailed view in section of the fastening device of FIG. 10, with the clamping piece in the clamping position.

The clamping piece 9 comprises a through-passage 22 which is more particularly visible in FIGS. 11 and 12. The through-passage 22 is made up of a first through-passage portion 22a extended by a second through-passage portion 22b, the through-passage portion 22a having a cross section (in this instance circular) of dimensions (diameter D22a here) smaller than those (diameter D22b here) of the second through-passage portion 22b.

The first through-passage portion 22a has a circular cross section of diameter D22a greater than the diameter D7a of the cross section of the first cylindrical portion 7a of the pin-mounted eccentric 7. The second through-passage portion 22b has a circular cross section that complements the (here circular) shape of the cross section of the second cylindrical portion 7b of the pin-mounted eccentric 7: in practice, the diameter D22b is not very much greater than or is equal to the diameter D7b of the second cylindrical portion 7b.

The pin-mounted eccentric 7 and the clamping piece 9 are secured to the flange 6 using a circlip 23.

Advantageously, the radial offset (eccentricity EX) between the fourth longitudinal axis IV-IV and the third longitudinal axis HI-III (FIG. 3) is greater than the difference between the diameter D22a of the first through-passage portion 22a of the clamping piece 9 and the diameter D7a of the first cylindrical portion 7a of the pin-mounted eccentric 7.

Starting from the clamping position illustrated in FIG. 12, the operator is able to turn the pin-mounted eccentric 7 about the second longitudinal axis II-II: the eccentricity of the second cylindrical portion 7b then causes the clamping piece 9 to move away from the first longitudinal axis I-I so as to release the sensor 2. Because the eccentricity EX (radial offset between the fourth longitudinal axis IV-IV and the third longitudinal axis III-III) is greater than the difference between the diameter D22a of the first through-passage portion 22a of the clamping piece 9 and the diameter D7a of the first cylindrical portion 7a of the pin-mounted eccentric 7, the lower (in FIG. 11) part of the first through-passage portion 22a in less than half a turn comes into abutment against the first cylindrical portion 7a in a release position (FIG. 11) which is stable.

Thus, the sizing explained hereinabove allows the pin-mounted eccentric 7 to immobilize the clamping piece 9 with respect to the flange 6 in a release position (FIG. 11) which is stable. Such a position allows the operator, having immobilized the clamping piece 9 with respect to the flange 6 in the release position, to insert or remove the sensor 2 into or from the longitudinal through-passage 4 without the risk of conflict with the clamping piece (as the clamping piece is situated outside of the continuation of the cross section of the longitudinal through-passage 4).

During use of the fastening device 1 according to the invention, the operator turns the cam (pin-mounted eccentric) 7 by action on the female socket drive 8a (or on the male socket drive) which is accessible on the frontal end face 7d of the cam 7, so as to move the clamping piece 9 between its release position (clamping surface 9a situated at the second distance d2 from the first longitudinal axis I-I) and its clamping position. To do that, the operator uses a screwdriving tool (such as a screwdriver which occupies only a small amount of radial space) able to collaborate with the female socket drive 8a (or male socket drive) of the driving means 8.

In the context of the first embodiment (FIGS. 1 to 8 and 13), the clamping piece 9 (arm 10) returns elastically to the release position (FIG. 2). In the context of the second embodiment (FIGS. 9 to 12), the operator preferably turns the cam (pin-mounted eccentric) 7 until the lower part of the first through-passage portion 22a comes into abutment with the first cylindrical portion 7a (FIG. 11). In both embodiments, the clamping piece 9 is then in a stable position and lies out of the continuation of the longitudinal through-passage 4 which is thus clear and freely accessible for the sensor 2 to be introduced unimpeded.

The operator then introduces the sensor 2 into the longitudinal through-passage 4 as far as the desired longitudinal position along the first longitudinal axis I-I (for example until the distal end 2b of the sensor 2 comes into abutment with the flaring 13).

By action on the female socket drive 8a (or the male socket drive), the operator then turns the cam (pin-mounted eccentric) 7 in rotation about the second longitudinal axis II-II, of which the second cylindrical portion 7b acts on the clamping piece 9 in order to move same into a clamping position (FIGS. 4 and 12) in which the clamping surface 9a presses on the exterior surface 2c of the sensor 2 (clamping surface 9a situated at the first distance d1 from the first longitudinal axis I-I). In the first embodiment, this is achieved by pivoting the arm 10 in the transverse plane P1 through elastic deformation of at least part of the arm 10 and/or of the spacer piece 11. The sensor 2 is then immobilized in the longitudinal through-passage 4 along the first longitudinal axis I-I.

In order to remove the sensor 2 from the longitudinal through-passage 4, the operator performs the abovementioned operations in the reverse order.

The present invention is not restricted to the embodiments which have been explicitly described but includes the various variants and generalizations thereof that are included within the scope of the claims that follow.

The invention claimed is:

1. A fastening device for holding a sensor having a cylindrical shaped bounded by a proximal end and a distal end, the fastening device comprising:
    a body comprising a longitudinal through-passage extending along a first longitudinal axis (I-I) between a first end and a second end, said longitudinal through-passage being intended to accept said sensor,
    axial-immobilization means for immobilizing the sensor in the longitudinal through-passage,
    wherein the axial-immobilization means comprise:
    a flange, solid with the body, flaring out radially from and away from the body and the first longitudinal axis (I-I),
    a cam mounted with the ability to rotate on the flange about a second longitudinal axis (II-II) parallel to the first longitudinal axis (I-I) and offset radially away from the first longitudinal axis (I-I),
    drive means rotationally driving the cam about the second longitudinal axis (II-II),
    a clamping piece that is fixed along the first longitudinal axis (I-I) with respect to the body and comprising a clamping surface intended to come into contact with the exterior surface of the sensor, and urged by the cam so as to be radially movable between at least:
    a clamping position in which the clamping surface is distant from the first longitudinal axis (I-I) by a first distance (d1),
    a release position in which the clamping surface is distant from the first longitudinal axis (I-I) by a second distance (d2), the second distance (d2) being greater than the first distance (d1).

2. The fastening device as claimed in claim 1, wherein the body comprises an interior screw thread over at least part of its length and/or the clamping surface comprises a screw thread intended to engage with an exterior screw thread provided on the exterior surface of the sensor.

3. The fastening device as claimed in claim 1, wherein the drive means for driving the rotation of the cam comprise a male or female socket drive of non-circular cross section, said socket drive extending parallel to the first longitudinal axis (I-I), said socket drive preferably being accessible on a frontal end face of the cam, which face is substantially perpendicular to the first longitudinal axis (I-I).

4. The fastening device as claimed in claim 1, wherein, at the second end of the longitudinal through-passage, a flaring extends radially inward and defines an orifice having a cross section with dimensions (D13) smaller than the dimensions (D2) of the cross section of the sensor.

5. The fastening device as claimed in claim 1, wherein the cam is a pin-mounted eccentric comprising:
    a first cylindrical portion of circular cross section extending along a third longitudinal axis (III-III), and intended to be housed for rotation in a hole formed in the flange along the second longitudinal axis (II-II),
    a second cylindrical portion of circular cross section extending along a fourth longitudinal axis (IV-IV) that is radially offset away from the third longitudinal axis (III-III), said second cylindrical portion being equipped with a lateral surface that is intended to come to bear against the clamping piece in order to urge the clamping piece to move from a release position to a clamping position.

6. The fastening device as claimed in claim 5, wherein the cylindrical lateral surface of the second cylindrical portion is equipped with reliefs, the reliefs preferably consisting of knurling.

7. The fastening device as claimed in claim 1, wherein the clamping piece is formed of one piece with the flange.

8. The fastening device as claimed in claim 7, wherein:
    the clamping piece comprises an arm comprising the clamping surface,
    said arm is connected to the flange by a spacer piece which holds the arm away from the flange along the first longitudinal axis (I-I),
    said arm is able to pivot in a transverse plane (P1) by elastic deformation of at least part of the arm and/or of the spacer piece.

9. The fastening device as claimed in claim 8, wherein the arm holds captive along the second longitudinal axis (II-II) the cam mounted with the ability to rotate in a hole in the flange.

10. The fastening device as claimed in claim 1, wherein the clamping piece consists of a component separate from the flange.

11. The fastening device as claimed in claim 10, wherein, in the release position, the cam immobilizes the clamping piece with respect to the flange.

12. The fastening device as claimed in claim 10, wherein:

the clamping piece comprises a through-passage consisting of a first through-passage portion extended by a second through-passage portion, the first through-passage portion having a cross section of dimensions smaller than those of the second through-passage portion, the first through-passage portion has a circular cross section of diameter (D22a) greater than the diameter (D7a) of the cross section of the first cylindrical portion of the pin-mounted eccentric, the second through-passage portion has a circular cross section that complements the shape of the cross section of the second cylindrical portion of the pin-mounted eccentric.

13. The fastening device as claimed in claim 12, wherein the radial offset (EX) between the fourth longitudinal axis (IV-IV) and the third longitudinal axis (III-III) is greater than the difference between the diameter (D22a) of the first through-passage portion of the clamping piece and the diameter (D7a) of the first cylindrical portion of the pin-mounted eccentric.

14. The fastening device as claimed in claim 1, wherein the body comprises a tubular portion having an exterior screw thread over at least part of its length.

15. The fastening device as claimed in claim 14, wherein:
the flange is solid with the body while being mounted with the ability to rotate with respect to the body about the first longitudinal axis (I-I),
the body comprises a drive portion of non-circular cross section.

16. The fastening device as claimed in claim 1, wherein the body and the flange are formed in a single piece as an assembly of substantially parallelepipedal shape.

* * * * *